United States Patent [19]

Comstock et al.

[11] 4,284,736

[45] * Aug. 18, 1981

[54] UNSATURATED POLYESTER COMPOSITIONS

[75] Inventors: Lowell R. Comstock, South Charleston; Percy L. Smith, Dunbar, both of W. Va.

[73] Assignee: Union Carbide Corporation, New York, N.Y.

[*] Notice: The portion of the term of this patent subsequent to Feb. 27, 1990, has been disclaimed.

[21] Appl. No.: 336,121

[22] Filed: Feb. 26, 1973

Related U.S. Application Data

[63] Continuation-in-part of Ser. No. 107,514, Jan. 18, 1971, abandoned, which is a continuation-in-part of Ser. No. 8,070, Feb. 2, 1970, abandoned, and Ser. No. 72,798, Sep. 16, 1970, Pat. No. 3,718,714.

[51] Int. Cl.$^3$ ............................................... C08L 67/06
[52] U.S. Cl. ................................ 525/169; 260/40 R; 525/170
[58] Field of Search ............ 260/862, 40 R; 525/169, 525/170

[56] References Cited

U.S. PATENT DOCUMENTS

| | | | |
|---|---|---|---|
| 2,627,482 | 2/1953 | Martin et al. | 117/126 |
| 3,700,624 | 10/1972 | Adachi et al. | 260/31.6 |
| 3,701,748 | 10/1972 | Kroekel | 260/40 |
| 3,718,714 | 2/1973 | Comstock | 260/862 |
| 3,721,642 | 3/1973 | Schalin et al. | 260/40 R |

FOREIGN PATENT DOCUMENTS

| | | | |
|---|---|---|---|
| 887693 | 12/1971 | Canada | 260/862 |
| 42-9269 | 5/1967 | Japan . | |

Primary Examiner—Earl A. Nielsen
Attorney, Agent, or Firm—George A. Skoler; Donald M. Papuga

[57] ABSTRACT

The disclosure of this application is directed to unsaturated polyester compositions, containing a thermoplastic terpolymer of a vinyl halide monomer, a vinyl ester of a saturated, monocarboxylic acid and as the third component, an unsaturated, dicarboxylic acid or anhydride thereof; or as the third component, a glycidyl ester of an unsaturated, monocarboxylic acid, which can be pigmented with organic and/or inorganic pigments and molded into shaped, thermoset articles such as housings for telephones, automobile heater ducts and the like which are characterized by excellent surface characteristics and color properties.

32 Claims, No Drawings

UNSATURATED POLYESTER COMPOSITIONS

This application is a continuation-in-part of our copending application Ser. No. 107,514 filed Jan. 18, 1971, now abandoned, which in turn is a continuation-in-part of application Ser. No. 8,070 filed Feb. 2, 1970, now abandoned and application Ser. No. 72,798 filed Sept. 16, 1970, now U.S. Pat. No. 3,718,714.

This invention relates to unsaturated polyester compositions containing a thermoplastic terpolymer of a vinyl halide monomer, a vinyl ester of a saturated, monocarboxylic acid and as the third component, an unsaturated, dicarboxylic acid or anhydride thereof; or as the third component, a glycidyl ester of an unsaturated, monocarboxylic acid. More particularly, this invention relates to unsaturated polyester compositions, as described, which can be pigmented with organic and/or inorganic pigments and used in molding applications to form shaped, thermoset articles such as housings for telephones, automobile heater ducts and the like which have excellent color properties and surface characteristics such as excellent smoothness and excellent reproduction of the surface contours of the mold in which they are formed into shaped, thermoset articles.

Compositions, based on unsaturated polyesters, are finding increased use in molding applications as compositions from which can be molded shaped articles, the surfaces of which reflect the surface characteristics of the mold. As a general rule, these compositions contain, in addition to the unsaturated polyesters, so-called low-profile additives such as poly(vinyl acetate). A low-profile additive is a material designed to insure that there is no undesirable shrinkage in the mold by the composition, to which the additive has been added, as the composition is being molded into a thermoset article. In other words, low-profile additives have been added to unsaturated polyester compositions for the purpose of obtaining compositions which can be molded into thermoset articles, the surfaces of which truly reflect the surface characteristics of the mold.

Although the use of low-profile additives, as described, does effect some degree of improvement in the anti-shrinkage characteristics of the unsaturated polyester compositions, it has been found that the resultant compositions have relatively poor internal pigmentation properties. That is to say, pigments cannot be adequately dispersed throughout these compositions so that upon being molded, shaped articles are produced having excellent color characteristics. Consequently, shaped articles produced from these compositions must be subjected to a painting step in order to obtain articles having acceptable color characteristics.

The present invention provides unsaturated polyester compositions which have an excellent balance of properties, including excellent internal pigmentation properties, with the result that molded articles produced therefrom are characterized by excellent smoothness, excellent color characteristics and excellent reproduction of the surface contours of the mold in which they were formed into shaped, thermoset articles.

The compositions of this invention comprise an unsaturated polyester and a thermoplastic terpolymer of: a vinyl halide monomer, a vinyl ester of a saturated, monocarboxylic acid and an unsaturated, dicarboxylic acid or anhydride thereof—Terpolymer I; or a terpolymer of a vinyl halide monomer, a vinyl ester of saturated, monocarboxylic acid and a glycidyl ester of an unsaturated, monocarboxylic acid—Terpolymer II.

The thermoplastic terpolymers of this invention, in the case of Terpolymer I, contain about 45 to about 95 percent by weight, preferably about 60 to about 95 percent by weight combined vinyl halide, about 5 to about 55 percent by weight, preferably about 5 to about 35 percent by weight combined vinyl ester of a saturated, monocarboxylic acid and about 0.25 to about 10 percent by weight, preferably about 0.5 to about 8 percent by weight unsaturated dicarboxylic acid or anhydride thereof. In the case of Terpolymer II, the amount of vinyl halide and vinyl ester of a saturated monocarboxylic acid are the same as in Terpolymer I, and the amount of combined glycidyl ester of an unsaturated monocarboxylic acid is about 1 to about 15 percent by weight, preferably about 1 to about 8 percent by weight.

The terpolymers are used in amounts of about 1 to about 85 and preferably about 3 to about 35 percent by weight, based on the weight of the unsaturated polyesters.

Vinyl halides suitable for purposes of this invention have the formula:

Formula I wherein X is halogen such as chlorine and bromine and R can be halogen or hydrogen. Illustrative of such monomers are: vinyl chloride, vinyl bromide, vinylidene chloride, vinylidene bromide and the like.

Among suitable vinyl esters of a saturated, monocarboxylic acid are those of the formula:

Formula II wherein R' is hydrogen or a saturated, aliphatic monovalent hydrocarbon radical, generally containing a maximum of 20 carbon atoms and preferably containing a maximum of 8 carbon atoms. Specific vinyl esters include among others vinyl formate, vinyl acetate, vinyl butyrate, vinyl isobutyrate, vinyl valerate, vinyl laurate and the like as well as vinyl cyclohexane carboxylate and the like. The term "aliphatic" as used with respect to Formula II is intended to include cycloaliphatic.

Illustrative of suitable unsaturated dicarboxylic acids, used in the preparation of the terpolymers, are those having the formula:

$C_nH_{2n-2}(COOH)_2$  Formula III wherein n is an integar having a value of 2 to 10 inclusive, preferably 2 to 10 inclusive. Among such acids can be noted fumaric acid, maleic acid, glutaconic acid, citraconic acid, itaconic acid, ethylidenemalonic acid, mesaconic acid, allylmalonic acid, propylidenemalonic acid, hydromuconic acid, pyrocinchonic acid, allyl succinic acid, carbocaprolactonic acid, teraconic acid, xeronic acids, cetylmalonic acid and other like ethylenically unsaturated acids.

If desired, the acid anhydrides of the acids previously described can be used per se or in admixture with the acids to produce the terpolymers of this invention.

Exemplary of glycidyl esters of unsaturated, monocarboxylic acids are compounds having the formula:

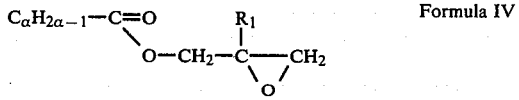 Formula IV where $a$ is an integar having a value of 2 to 10 inclusive, preferably 2 to 6 inclusive and $R_1$ is hydrogen or methyl. Unsaturated, monocarboxylic acids which can be esterified with a glycidyl alcohol to produce compounds falling with the scope of Formula IV include, acrylic acid, methacrylic acid, ethacrylic acid, crotonic acid, isocrotonic acid, pentenic acid and the like. Halogenated derivatives of these acids such as chloracrylic acid can be used if so desired. Glycidyl alcohols which can be used to esterify the unsaturated, monocarboxylic acids include glycidyl alcohol, $\alpha$-methylglycidyl alcohol and the like.

As a general rule, the terpolymers have inherent viscosities (ASTMD 1243-58T) of about 0.12 to about 10, generally about 0.12 to about 1 and preferably about 0.19 to about 0.52.

The unsaturated polyesters which are admixed with the terpolymers, as previously described, to provide the compositions of this invention are condensation reaction products of an unsaturated polycarboxylic acid and a polyol and generally have an average molecular weight of about 500 to about 10,000, preferably about 1,000 to about 6,000, which based on an acid number, have an acid number less than 100.

Illustrative of suitable unsaturated polycarboxylic acids which are condensed with the polyols to produce the unsaturated polyesters of this invention are those falling within the scope of Formula III, as well as 4-amyl-2,5-heptadienedioic acid, 3-hexynedioic acid, tetrahydrophthalic acid, 3-carboxy cinnamic acid and the like.

If desired, the acid anhydrides of the acids previously described can be used per se or in admixture with the acids to produce the unsaturated polyesters of this invention.

In addition to the anhydrides of the acids noted above, the following acid anhydrides can also be used: pentyl succinic anhydride, octenyl succinic anhydride, nonenyl succinic anhydride, chloromaleic anhydride, dichloromaleic anhydride, hexachloroendomethylene tetrahydrophthalic anhydride, commonly referred to as chlorendic anhydride, the Diels-Alder adducts of maleic acid and alicyclic compounds having conjugated double bonds such as methylbicyclo-[2,2,1]-hepten-2,3-dicarboxylic anhydride and the like.

If desired, aromatic polycarboxylic acids, saturated polycarboxylic acids, anhydrides thereof or monocarboxylic acids can be used, in conjunction with the unsaturated polycarboxylic acids or the anhydrides thereof, to produce the unsaturated polyesters.

Illustrative of saturated polycarboxylic or aromatic polycarboxylic acids include, among others, phthalic acid, hexahydrophthalic acid, tetrachlorophthalic acid, succinic acid, adipic acid, suberic acid, azelaic acid, sebacic acid, dimethyl succinic acid and the like as well as derivatives thereof, e.g., chlorinated derivatives.

Among suitable monocarboxylic acids, which usually contain a maximum of twenty-two carbon atoms are benzoic acid, hexanoic acid, caprylic acid, lauric acid, caproic acid, myristic acid, palmitic acid, stearic acid, arachidic acid, palmitoleic acid, oleic acid, linoleic acid, linolenic acid, eleostearic acid, licanic acid, ricinoleic acid, hexenoic acid, hexadienoic acid, octenoic acid, and the like. It is advantageous for purposes of economy to employ mixtures of acids, particularly those derived from natural sources such as castor oil, dehydrated castor oil, coconut oil, cottonseed oil, linseed oil, oiticaca oil, perilla oil, olive oil, safflower oil, soybean oil, tall oil, sardine oil, tung oil (China wood oil), and the like.

Illustrative of suitable polyols for purposes of this invention are the dihydric alcohols or diols having the formula:

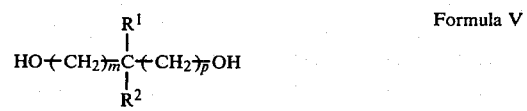 Formula V wherein the sum of $m+p$ is at least 1, preferably 1 to 20 inclusive and $R^1$ and $R^2$, which can be the same or different are hydrogen or alkyl and when alkyl, containing 1 to 20 carbon atoms inclusive. Specific compounds include, among others, ethylene glycol, propylene glycol, butanediol-1,2, butanediol-1,3, butanediol-1,4, hexanediol-1,6, decanediol-1,10, neopentyl glycol and the like.

Also suitable are the ether diols having the general formula:

 Formula VI $$HO-(C_aH_{2a}O)_xH$$

wherein $a$ has a value of at least 1, preferably 2 to 6 inclusive, and $x$ has a value of at least 2, preferably 2 to 10 inclusive. Among compounds falling within the scope of this formula are diethylene glycol, dipropylene glycol, triethylene glycol, tetraethylene glycol and the like.

Other suitable polyols are the polyhydric compounds such as trimethylpentanediol, pentaerythritol, dipentaerythritol, diglycerol, glycerol, pentaglycerol, polyvinyl alcohol, trimethylolpropane and the like as well as the polyalkylene glycols such as polyethylene glycol and polypropylene glycol having molecular weights of about 1,000 to about 20,000.

Preparation of unsaturated polyesters can be carried out by methods well known in the art. As a rule, the condensation reaction is conducted by reacting a mixture containing an unsaturated polycarboxylic acid and a polyol, in an amount of about 2 to about 15 percent in molar excess with respect to the "acidic" reactant, at temperatures on the order of about 160° C. to about 250° C., preferably about 175° C. to about 225° C., to polyesters having an acid number of less than about 100, generally about 10 to about 70, preferably about 25 to about 50.

As previously stated the compositions of this invention can be pigmented and molded into shaped articles characterized by excellent color characteristics.

Pigments, that is finely divided, insoluble materials that impart a color to the material to which they are added or make the material black, white or gray, that can be used to prepare the pigmented compositions of this invention are organic pigments as well as inorganic pigments. Among suitable organic pigments are: carbon black, phthalocyanine blue, phthalocyanine green, nadder lake, indanthrone, pigment green B and the like.

Illustrative of suitable inorganic pigments are: black iron oxide, titanium dioxide, cobalt aluminate, cadmium-mercury, cadmium sulfo-selenide, iron blue, ceramic yellow, ultramarine blue, hydrated chrome oxide, sienna, chrome yellow and the like.

The amount of pigment used is generally about 0.1 to about 5 percent by weight and preferably about 0.3 to about 2 percent by weight based on the total weight of the molding composition.

In formulating the compositions of this invention which are to be used in molding applications such as sheet molding, premix and preform, it is customary to admix therewith the following materials, with or without pigments.

1. A polymerizable ethylenically unsaturated monomer which serves to cross-link the unsaturated polyester to a thermoset product.
2. A peroxide which serves to accelerate the cross-linking reaction.
3. A thickening agent which serves to provide body to the compositions by increasing the viscosity of the polyesters.
4. Fillers, including fillers which serves as reinforcing agents.

Illustrative of suitable polymerizable, ethylenically unsaturated monomers are the vinyl monomers having the formula:

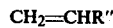
$$CH_2=CHR''$$  Formula VII wherein R'' is a group having an unsaturated, carbon-to-carbon, carbon-to-oxygen, or carbon-to-nitrogen group in conjugation with the vinyl group. Groups having such unsaturation in conjugation with the vinyl group are aryl, ketonic, heterocyclic, nitrile, carbalkoxy, carboxy and amido.

Specific vinyl monomers include the following:

Wherein R is aryl; styrene, halogenated styrenes such as chlorostyrene, α-chlorostyrene, p-iodostyrene, m-flurostyrene, dichlorostyrene and the like; alkyl substituted styrenes such as p-methyl styrene, p-ethyl styrene, o-tert-butyl styrene and the like; alkoxy and aryloxy substituted styrenes such as p-ethoxy styrene, p-propoxy styrene, p-phenoxy styrene and the like; as well as α-methylstyrene.

Wherein R is ketonic; ethyl vinyl ketone, n-propyl vinyl ketone, phenyl vinyl ketone and the like;

wherein R is heterocyclic; vinyl pyridine, vinyl quinoline, vinyl pyrrole, vinyl carbazole, vinyl thiophene and the like;

wherein R is amido, acrylamide, bicycloheptylacrylamide, diacetoneacrylamide and the like wherein R is nitrile, acrylonitrile and the like;

wherein R is carboxy; acrylic acid and the like;

wherein R is carbalkoxy; methyl acrylate, methyl methacrylate, butyl acrylate, octylacrylate, lauryl acrylate, cyclohexyl acrylate, phenyl acrylate, benzyl acrylate, diallylphthalate and the like.

Also suitable is diallylphthalate and the like.

The amount of ethylenically unsaturated monomer used can vary over wide limits. For example, the monomer can be used in amounts of about 10 to about 60 percent by weight based on the combined weight of the monomer and the unsaturated polyester. It is preferred to use about 20 to about 50 percent by weight ethylenically unsaturated monomer, based on the combined weight of the monomer and unsaturated polyester.

Among suitable peroxides that can be used are those which function as free-radical polymerization iniators.

Examples of such peroxides are the hydroperoxides such as tert-butyl hydroperoxide, cumene hydroperoxide, para menthane hydroperoxide and the like; peroxy esters such as di-tert-butyl diperoxide phthalate, tert-butyl peroxyacetate, tert-butylperbenzoate and the like; alkyl peroxides such as ditert-butyl peroxide, 2,5-dimethyl-2,5-bis(tert-butyl peroxy hexyne-3, dibenzyl peroxide and the like; ketone peroxides such as methyl ethyl ketone peroxide, cyclohexanone peroxide and the like; acyl peroxides such as benzoyl peroxide, para-chlorobenzoyl peroxide, 2,4-dichlorobenzoyl peroxide, lauroyl peroxide and the like.

The amount of peroxide used is sufficient to effect a cross-linking or thermosetting of the composition in a relatively short period of time. As a rule, the amount used is about 0.1 to about 5 percent and preferably about 0.5 to about 2 percent by weight based on the weight of the unsaturated polyester.

Among suitable thickening agents are the oxides and hydroxides of metals of Groups I, II and IV of the Periodic Table (Handbook of Chemistry and Physics—50th Edition).

Illustrative of specific oxides and hydroxides of the metals noted are the following: magnesium oxide, calcium oxide, zinc oxide, barium oxide, potassium oxide, magnesium hydroxide, calcium hydroxide, titanium oxide, lead oxide, and the like.

The thickening agents are used in amounts of about 0.5 to about 75 and preferably in amounts of about 1 to about 5 percent by weight based on the weight of the unsaturated polyester.

Fillers which are commonly employed in polyester compositions include, among others, glass fibers, clay, calcium carbonate, silica, hydrated alumina and the like. These materials are generally used in amounts of about 10 to about 300 percent by weight generally about 50 to about 200 percent by weight based on the weight of the polyester resin.

If desired other polymers such as poly(epsilon caprolactone) can be added to the compositions of this invention. The compositions of this invention can be prepared by mixing the components in a suitable apparatus such as a Cowles dissolver, a sigma blade mixer at temperatures on the order of about 23° C. to about 50° C.

Once formulated, the compositions can be used in molding applications as previously described. The actual molding cycle will, of course, depend upon the exact composition being molded. Suitable molding cycles are conducted at temperatures on the order of about 250° F. to about 350° F. for periods of time ranging from about 0.5 minute to about 5 minutes.

When utilizing the compositions of this invention in sheet and bulk molding applications wherein pigmentation is desired, pigment and thickener are added to the composition and the resultant compositions allowed to B-stage, at room temperature to a molding viscosity, generally about 20 million to 100 million centipoises. The compositions are then molded into shaped articles of desired shape.

The following examples further illustrate the present invention and are not intended to limit the scope thereof in any manner.

In the Examples 1–3 and Controls 1–3 which follow, the components of each composition were admixed in a Cowles dissolver, the resultant composition then transferred to aluminum dishes, approximately 0.5 inch in depth and 2.5 inches in diameter, allowed to thicken and thereafter cured to thermoset products in a circulating air oven which was at a temperature of 150° C. Time of cure cycle—15 minutes.

The unsaturated polyester of these Examples and Controls was prepared by condensing a mixture of 1 mole of o-phthalic acid anhydride, 3 moles of maleic acid anhydride and 4.4 moles of propylene glycol at a temperature of 200° C. to an acid number of about 35. The polyester was then cooled to about 150° C. and hydroquinone was added thereto in an amount of about 0.014 percent by weight, based on the weight of the polyester. Styrene was then admixed with the polyester to obtain a solution containing 30 percent by weight styrene.

EXAMPLE 1

| | Parts By Weight |
|---|---|
| Unsaturated polyester Styrene Solution | 100 |
| Low-Profile Additive (Added as a Styrene Solution containing 35 Percent by weight Styrene) | 75 |
| Diglycidylether of 2,2-Bis-(p-hydroxyphenyl)propane-(heat stabilizer for the low-profile additive) | 3.0 |
| Magnesium Oxide | 0.7 |
| Calcium Carbonate | 150 |
| Tert-Butyl Perbenzoate | 1.5 |
| Mercury-Cadmium Red Pigment (40 percent by weight solids in liquid polyester) | 18.0 |

The cured product was uniformly pigmented. Color—dark red. Pigmentation rating—excellent.

The low-profile additive of Example 1 was a thermoplastic terpolymer containing 81 percent by weight combined vinyl chloride, 17 percent of weight combined vinyl acetate and 2 percent by weight combined maleic acid anhydride. The terpolymer of an inherent viscosity of 0.31.

The composition of Example 1 was thickened to 30 million centipoises prior to being subjected to the "cure" cycle. Viscosity determinations noted herein were made using a Brookfield viscometer, model HBT.

The liquid polyester of this example, in which the pigment was dispersed, was prepared by condensing 1 mole of maleic acid anhydride with 1.2 moles of dipropylene glycol.

EXAMPLE 2

Example 1 was repeated wtih the exception, however, that in lieu of the low-profile additive—styrene solution of Example 1, there was used, a styrene solution of a thermoplastic terpolymer of vinyl chloride, vinyl acetate and glycidyl methacrylate containing 40 percent by weight styrene. The terpolymer has an inherent viscosity of 0.29, a combined vinyl chloride content of 78 percent by weight, a combined vinyl acetate content of 12 percent by weight, a combined vinyl acetate content of 12 percent by weight and a combined glycidyl methacrylate content of 10 percent by weight. Also, the composition was thickened to 25 million centipoises before being cured.

The cured product was uniformly pigmented. Color—dark red. Pigmentation rating—excellent.

EXAMPLE 3

Example 1 was repeated with the exception, however, that in lieu of the low-profile additive-styrene solution of Example 1, there was used, a styrene solution of a thermoplastic terpolymer of vinyl chloride, vinyl acetate and maleic acid anhydride containing 33 percent by weight styrene. The terpolymer has an inherent viscosity of 0.38, a combined vinyl chloride content of 83 percent by weight, a combined vinyl acetate content of 16 percent be weight and a combined maleic acid anhydride content of 1 percent by weight. Also, the composition was thickened to 25 million centipoises before being cured.

The cured product was uniformly pigmented. Color—dark red. Pigmentation rating—excellent.

On repeating Example 1, using in one case carbon black as the pigment in a dispersion containing 33 percent by weight carbon black in the liquid polyester; and in the second case using as the low-profile additive, a terpolymer of vinyl chloride, vinyl acetate and fumaric acid in a combined weight ratio of 80-18-2, cured products were obtained having excellent pigmentation.

CONTROL 1

Example 1 was repeated with the exception however that in lieu of the low-profile additive-styrene solution of Example 1, there was used: a thermoplastic polymer of cellulose acetate butyrate. Also, the composition was thickened to 30 million centipoises before being cured.

The cured product had white areas. Pigmentation rating—poor.

CONTROL 2

Example 1 was repeated with the exception however, that in lieu of the low-profile additive-styrene solution of Example 1, there was used a styrene solution of a thermoplastic terpolymer of vinyl chloride, vinyl acetate and acrylic acid containing 40percent by weight styrene. The terpolymer had an inherent viscosity of 0.33, a combined vinyl chloride content of 60 percent by weight, a combined vinyl acetate content of 39 percent by weight and a combined acrylic acid content of 1 percent by weight. Also, the composition was cured to 30 million centipoises before being cured.

The cured product was not uniformly pigmented. The cured product was pale red with large white areas. Pigmentation rating—poor.

CONTROL 3

Control 2 was repeated using as the terpolymer, a terpolymer of vinyl chloride, vinyl acetate and acrylic acid wherein the terpolymer had an inherent viscosity of 0.36, a combined vinyl chloride content of 55 percent by weight, a combined vinyl acetate content of 43 percent by weight and a combined acrylic acid content of 2percent by weight.

The cured product had white areas interspersed with fairly dark red areas. Pigmentation rating—fair.

"Premix" compositions were prepared, panels molded therefrom and properties of the compositions determined by subjecting the molded panels to various tests.

In preparing a "premix" molding composition, an initial composition was prepared, to which was then added, various fillers and glass fibers to prepare the final "premix" composition. The initial composition was prepared by charging the materials to a Hobart mixer and mixing the materials for about 30 minutes. To this mixture, there was then added the fillers and mixing continued for about 30 minutes. Glass fibers were then added to the contents of the Hobart mixer and mixing was continued for 3 to 5 minutes.

"Premix" composition were then used to mold panels, ⅛ of an inch thick, in a matched metal mold under the following molding cycle:

| | |
|---|---|
| pressure | = 500 psig |
| temperature | = 300° F. |
| time of molding cycle | = 2-3 minutes |

Formulation of the compositions and the low-profile additives used are shown below and in Table I.

| Premix Composition Formulation | Grams |
|---|---|
| Unsaturated Polyester-Styrene Solution of Example 1 | 440 |
| Styrene | 144 |
| Low-Profile Additive | 96 |
| Calcium Carbonate } fillers | 640 |
| Aluminum Silicate Clay | 400 |
| tert-butylperbenzoate | 176 |
| 2,5-Dimethyl-2,5-bis-(tert-butylperoxy)hexyne-3 | 14 |
| Zinc Stearate | 4.0 |
| Black Iron Oxide - Pigment | 2.0 |
| p-Benzoquinone | 0.04 |
| Magnesium Oxide | 6.6 |
| Glass Fibers - ¼ inch | 300 |

TABLE I

| Premix Compositions | Low-Profile Additive | Inherent Viscosity | Percent By Weight Based on Unsaturated Polyester | MCR-Micro-Inches/Inch |
|---|---|---|---|---|
| Example 4 | Thermoplastic Polymer of vinyl acetate-vinyl chloride, maleic acid | 0.48 | 30 | 300 |
| Example 5 | Thermoplastic Polymer of vinyl acetate-vinyl chloride, maleic acid | 0.40 | 30 | 350 |
| Example 6 | Thermoplastic Polymer of vinyl acetate, vinyl chloride, glycidyl acrylate | 0.29 | 30 | 400 |
| Control 4 | None | — | 0 | 2000 |

The polymers of Examples 4–6 are further described as follows:

| | Percent By Weight Combined Monomers |
|---|---|
| Example 4 | |
| vinyl acetate | 13 |
| vinyl chloride | 86 |
| maleic acid | 1 |
| Example 5 | |
| vinyl acetate | 16 |
| vinyl chloride | 83 |
| maleic acid | 1 |
| Example 6 | |
| vinyl acetate | 21 |
| vinyl chloride | 78 |

| | Percent By Weight Combined Monomers |
|---|---|
| glycidyl acrylate | 1 |

"Preform" molding composition was prepared by admixing the components of the composition in a high speed mixer for about 30 minutes. Portions of the composition were charged into a matched metal mold in which had been preformed, into the shape of the mold, a 30 gram, fiber glass sheet.

Panels, ⅛ of an inch thick, were then molded under the following molding conditions:
Pressure 500 psig
Temperature 275° F.
Time of Molding Cycle = 2 minutes Formulation of the compositon and properties thereof are tabulated below in Example 7.

EXAMPLE 7

| | Parts By weight |
|---|---|
| Unsaturated Polyester-Styrene Solution of Example 1 | 19.5 |
| Low-Profile Additive-Styrene Solution of Example 1 | 10.4 |
| Styrene | 1.7 |
| Aluminum Silicate Clay | 28 |
| 2-5-Dimethyl-2-5-bis(tert-butylperoxy)hexyne-3 | 0.35 |
| Mold release agent | 0.35 |
| Properties | |
| Smoothness (MCR) | 194 |
| Tensile Strength (psi) | 13,000 |
| Flexural Strength (psi) | 28,000 |
| Wet Flexural Strength (psi) | 23,000 |
| Retention Flexural Strength (%) | 82 |
| Flexural Modulus (psi × $10^5$) | 1.51 |
| Wet Flexural Modulus (psi × $10^5$) | 1.10 |
| Retention Flexural Modulus (%) | 73 |
| Barcol Hardness (935 scale) | 47 |
| Water Absorption - % by Weight | 0.80 |
| Reverse Impact - Inch | 2.0 |
| Izod impact strength-Ft.-Lbs.-Inch | 20.5 |

The mold release agent of this example was a liquid alkyl phosphate, sold under the designation ZELEC by Dupont.

Tensile strength determinations in this specification were carried out according to the procedure described in ASTM Test 638-64T.

Elongation determinations noted in this specification were carried out according to the procedure described in ASTM 638-64T.

Modulus determinations noted in this specification were carried out according to the procedure described in ASTM Test 790-66.

Water Absorption was determined using two test specimens one inch by three inches, but from panels which were molded as described previously. The edges of each test specimen were sanded until smooth and the specimens were then preconditioned for 1 hour at a temperature of 100° C. The preconditioned specimens were cooled to room temperature, about 23° C. in a desiccator and weighed. After being weighed, the specimens were immersed in distilled water, which was at boiling temperature, for 24 hours. At the end of the 24-hour period, the specimens were wiped dry with lint-free paper and reweighed. Water absorption expressed in terms of percent, was the average gain in weight of the two samples.

Wet Flexural Strength and Wet Flexural Modulus tests were conducted after test samples were immersed in water, which was at about room temperature—23° C.—for twenty-four hours.

Reverse Impact—determined by dropping a one-half pound steel ball, at measured distances, onto panels having a thickness of about 100 mils. The distance, in inches through which the steel ball dropped and caused a fracture on the reverse side of the panel was noted and reported as reverse impact.

Surface Smoothness—determined by measuring surface waviness using a microcorder. Reported in micro inches/inch. Lowest readings indicate smoothest surface.

What is claimed is:

1. A polyester composition, suitable for use in molding, comprising an ethylenically unsaturated monomer, an unsaturated polyester which is the condensation product of an ethylenically unsaturated polycarboxylic acid or anhydride and a polyol, and, as a low profile additive, a thermoplastic terpolymer of a vinyl halide monomer, a vinyl ester of a saturated, monocarboxylic acid, and as the third component of said terpolymer an unsaturated dicarboxylic acid or anhydride thereof; or as the third component a glycidyl ester of an unsaturated, monocarboxylic acid, said terpolymer being present in said composition in an amount of about 1 to about 85 percent by weight based on the weight of said unsaturated polyester, wherein said terpolymer contains (a) at least about 45 weight percent polymerized vinyl halide, (b) from about 0.25 to about 10 weight percent of polymerized unsaturated dicarboxylic acid or anhydride thereof, or from about 1 to about 15 weight percent of polymerized glycidyl ester of an unsaturated, monocarboxylic acid, and (c) the remainder of said terpolymer being polymerized vinyl ester of a saturated, monocarboxylic acid.

2. A polyester composition, suitable for use in molding, comprising an ethylenically unsaturated monomer, an unsaturated polyester which is the condensation product of an ethylenically unsaturated polycarboxylic acid or anhydride and a polyol, and, as a low profile additive, a thermoplastic terpolymer of a vinyl halide monomer, a vinyl ester of a saturated monocarboxylic acid and an unsaturated, dicarboxylic acid or anhydride thereof, said terpolymer containing about 45 to about 95 percent by weight combined vinyl halide monomer, about 5 to about 55 percent by weight combined vinyl ester of a saturated, monocarboxylic acid, and about 1 to about 10 percent by weight combined dicarboxylic acid or anhydride thereof, and is present in said composition in an amount of about 1 to about 85 percent by weight based on the weight of said unsaturated polyester.

3. A polyester composition, suitable for use in molding, comprising an ethylenically unsaturated monomer, an unsaturated polyester which is the condensation product of an ethylenically unsaturated polycarboxylic acid or anhydride and a polyol, and, as a low profile additive, a thermoplastic terpolymer of a vinyl halide monomer, a vinyl ester of a saturated, monocarboxylic acid, and a glycidyl ester of an unsaturated, monocarboxylic acid, said terpolymer containing about 45 to about 95 percent by weight combined vinyl halide monomer, about 5 to about 55 percent by weight combined vinyl ester of a saturated, monocarboxylic acid, and about 1 to about 15 percent by weight combined glycidyl ester of an unsaturated, monocarboxylic acid, and is present in said composition in an amount of about 1 to about 85 percent by weight based on the weight of said unsaturated polyester.

4. A polyester composition, suitable for use in molding, comprising an unsaturated polyester which is the condensation product of an ethylenically unsaturated polycarboxylic acid or anhydride and a polyol, a polymerizable ethylenically unsaturated monomer in an amount of about 10 to about 60 percent by weight based on the combined weight of said monomer and said polyester, a Group I, II or IV metal oxide or hydroxide thickener in an amount of about 0.5 to about 75 percent by weight based on the weight of said polyester, and, as a low profile additive, a terpolymer as defined in claim 1, said terpolymer being present in an amount of about 1 to about 85 percent by weight.

5. A composition comprising (A) an unsaturated polyester which is the condensation product of at least one ethylenically unsaturated dicarboxylic acid with at least one dihydric alcohol, (B) an ethylenically unsaturated monomer, and (C) 1 to 85 percent by weight, based on polyester, of a terpolymer containing about 45 to about 95% by weight combined vinyl chloride, about 5 to about 55% by weight combined vinyl acetate, and about 1 to about 10% by weight of an ethylenically unsaturated dicarboxylic acid.

6. A polyester composition as defined in claim 1 wherein said thermoplastic terpolymer is present in said composition in an amount of about 3 to about 35 percent by weight based on the weight of said unsaturated polyester.

7. A polyester composition as defined in claim 2 wherein said terpolymer contains about 60 to about 95 percent by weight combined vinyl halide monomer, about 5 to about 35 percent by weight combined vinyl ester of a saturated, dicarboxylic acid and about 0.5 to about 8 percent by weight unsaturated dicarboxylic acid or anhydride thereof.

8. A polyester composition as defined in claim 2 wherein said vinyl halide monomer has the formula:

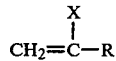

wherein X is halogen and R is halogen or hydrogen; said vinyl ester of a saturated, monocarboxylic acid has the formula:

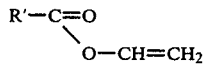

wherein R' is hydrogen or a saturated, aliphatic monovalent hydrocarbon radical having a maximum of 20 carbon atoms; and said unsaturated dicarboxylic acid has the formula:

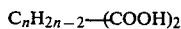

wherein n is an integer having a value of 2 to 20 inclusive.

9. A polyester composition as defined in claim 1 wherein the thermoplastic terpolymer is a terpolymer of vinyl chloride, vinyl acetate and maleic acid or anhydride thereof.

10. A polyester composition as defined in claim 3, wherein said terpolymer contains about 60 to about 95 percent by weight combined vinyl halide monomer, about 5 to about 35 percent by weight combined vinyl ester of a saturated, dicarboxylic acid and about 1 to about 8 percent by weight of a glycidyl ester of an unsaturated dicarboxylic acid.

11. A polyester composition as defined in claim 3 wherein said vinyl halide monomer has the formula:

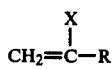

wherein X is halogen and R is halogen or hydrogen; said vinyl ester of a saturated, monocarboxylic acid has the formula:

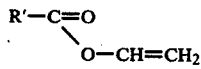

wherein R' is hydrogen or a saturated, aliphatic monovalent hydrocarbon radical having a maximum of 20 carbon atoms; and said glycidyl ester of an unsaturated, monocarboxylic acid has the formula:

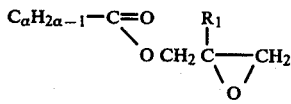

wherein $\alpha$ is an integer having a value of 2 to 10 inclusive and $R_1$ is hydrogen or methyl.

12. A polyester composition as defined in claim 1 wherein the thermoplastic terpolymer is a terpolymer of vinyl chloride, vinyl acetate and glycidyl acrylate.

13. A polyester composition as defined in claim 1 wherein the thermoplastic terpolymer is a terpolymer of vinyl chloride, vinyl acetate and glycidyl methacrylate.

14. A composition as defined in claim 4 wherein: the ethylenically unsaturated monomer is present in an amount of about 20 to about 50 percent by weight based on the combined weight of said monomer and said polyester; the Group I, II or IV metal oxide or hydroxide is present in an amount of about 1 to about 5 percent by weight based on the weight of said polyester; and said terpolymer is present in an amount of about 3 to about 35 percent by weight.

15. A composition as defined in claim 4 containing a terpolymer as defined in claim 5.

16. A composition as defined in claim 4 containing a terpolymer as defined in claim 10.

17. A composition as defined in claim 4 wherein the unsaturated polyester is the condensation reaction product of a mixture containing a polyol and an unsaturated polycarboxylic acid or anhydride thereof.

18. A composition as defined in claim 4 wherein the thickener is a Group II metal oxide.

19. A composition as defined in claim 4 wherein the thickener is a Group II metal hydroxide.

20. A composition as defined in claim 4 wherein the thickener is a Group IV metal oxide.

21. A composition as defined in claim 4 wherein the thickener is a Group IV metal hydroxide.

22. A composition as defined in claim 4 wherein the thickener is calcium hydroxide.

23. A composition as defined in claim 4 wherein the polyol has the formula:

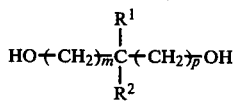

wherein the sum of $m+p$ equals at least one, $R^1$ and $R^2$ are hydrogen or alkyl.

24. A composition as defined in claim 4 wherein the polyol has the formula:

wherein a has a value of at least one, x has a value of at least 2.

25. A composition as defined in claim 4 wherein the polyol is ethylene glycol and the acid is fumaric acid.

26. A composition as defined in claim 4 wherein the polyol is propylene glycol and the acid anhydride is maleic acid anhydride.

27. A composition as defined in claim 4 wherein the ethylenically unsaturated monomer is a vinyl monomer.

28. A composition as defined in claim 27 wherein the vinyl monomer is styrene.

29. A free-radical polymerization-initiated thermoset product of the composition defined in claim 4.

30. A composition as defined in claim 4 wherein the thickener is a Group I metal oxide.

31. A composition as defined in claim 4 wherein the thickener is a Group I metal hydroxide.

32. A composition as defined in claim 4 containing a pigment.

* * * * *